United States Patent [19]
Shimano

[11] Patent Number: 5,630,263
[45] Date of Patent: May 20, 1997

[54] MANUFACTURING METHOD OF EXPANDED MESH

[75] Inventor: Tadakazu Shimano, Takatsuki, Japan

[73] Assignee: Yuasa Corporation, Osaka, Japan

[21] Appl. No.: 454,204

[22] PCT Filed: Dec. 27, 1993

[86] PCT No.: PCT/JP93/01899

§ 371 Date: Jun. 2, 1995

§ 102(e) Date: Jun. 2, 1995

[87] PCT Pub. No.: WO94/15375

PCT Pub. Date: Jul. 7, 1994

[30] Foreign Application Priority Data

Dec. 28, 1992 [JP] Japan .................................. 4-360487
Aug. 11, 1993 [JP] Japan .................................. 5-220654

[51] Int. Cl.⁶ .................................. H01M 4/82; B21D 47/02
[52] U.S. Cl. .................................. 29/2; 29/6.2
[58] Field of Search .................................. 29/6.1, 6.2, 2; 429/241, 242

[56] References Cited

U.S. PATENT DOCUMENTS 3,310,438  3/1967  Huffman et al. .................. 429/245 X
3,607,411  9/1971  Brownrigg .......................... 29/6.1
3,891,459  6/1975  McCartney, Jr. ................. 429/241 X

FOREIGN PATENT DOCUMENTS 52-128530  10/1977  Japan .
54-157236  12/1979  Japan .
58-70672   5/1983   Japan .
58-165251  9/1983   Japan .
60-231531  11/1985  Japan .
2-270266   11/1990  Japan .

*Primary Examiner*—Anthony Skapars
*Attorney, Agent, or Firm*—Evenson, McKeown, Edwards & Lenahan P.L.L.C.

[57] ABSTRACT

In an expanded mesh of this invention, a latitude skeletal element composing a mesh has a length which is substantially not elongated from a state of a sheet-shaped material. For this reason, the expanded mesh is not bulged like a barrel. Namely, it is flat. Since a longitudinal skeletal element is inclined acutely relative to straight portions as compared with a conventional expanded mesh, the expanded mesh will become a grid with good current collecting efficiency when a lug of current collector plate is formed on an inclining direction side.

2 Claims, 10 Drawing Sheets

1

MANUFACTURING METHOD OF EXPANDED MESH

TECHNICAL FIELD

This invention relates to an expanded mesh and its manufacturing method, and further to a lead acid storage battery plate using the expanded mesh.

BACKGROUND ART

There are an after stretching system and a simultaneous opening system in an expanding work method. The after stretching system is one in which cut slits are first made in a sheet-shaped material and the cut slits are then expanded, as disclosed for example in Published Patent Application (KOKAI) No. 52-144745. The simultaneous opening system is one in which the cut slits are made in the sheet-shaped material and the cut slits are expanded simultaneously, and which is classified into a parallel cutter system and a right angle cutter system. The parallel cutter system is one which uses cutter lines comprising cutters arranged stepwise and in parallel each other so as to give broken lines parallel with a feed direction of the sheet-shaped material, as disclosed for example in Published Patent Application (KOKAI) No. 53-79760. The right angle cutter system is one in which one row of cutter lines arranged right angle to the feed direction of the sheet-shaped material is moved vertically and the cutters are swung in an arranged direction on every pitch in order to put meshes into zigzag positions, as disclosed for example in U.S. Pat. No. 3,310,438.

Generally, a grid for use in the lead acid storage battery plate has so far been manufactured by casting or machining. However, a percentage of manufacture by machining providing a high productivity is increasing in recent years, and a manufacturing method using expanding work of sheet-shaped material made of lead alloy is prevailing now as a typical machining work. A grid which is formed from an expanded sheet-shaped material made of copper alloy, attached by casting with a current collector plate having a lug, and coated with lead on its surface thereafter, may be mentioned as a grid for use in a comparatively large lead acid storage battery plate.

However, the above-mentioned after stretching system has included such a problem that a special expanding process has been required.

The parallel cutter system has included such a problem that a die-set having a very long cutter line has been required because a pitch of cutter has had to be made 1.5 times as large as a pitch in cut length direction of the sheet-shaped material and it had not been able to expand the cut lines largely in spite of an expanding direction being same with a direction of height of reticulated portion. The right angle cutter system has included such a problem that it has not been able to continuously manufacture the expanded mesh having a non-expanded part and a reticulated portion and a high-speed production has been impossible because it has been required to swing the cutter line.

The expanded mesh obtained by the conventional method has included a problem of poor current collecting efficiency because of an obtuse inclining angle of skeletal element composing the mesh relative to side edges.

In the above conventional system, only a cutter merely making the cut slits can be used as a cutter for forming a mesh adjacent to the non-expanded portion in order not to elongate the non-expanded portion. Therefore, the system has included such a problem that it has not been able to form a large mesh in this part and to effectively utilize the sheet-shaped material.

In the grid for use in a comparatively large lead acid storage battery plate, a current collector plate having a lug is formed separately and attached to the expanded mesh. In this way, a large expanded mesh is manufactured by the right angle cutter system. For this reason, there have been such problems that the expanded mesh has been corrugated over its entire circumference, a process for remedying the entire circumference after installing another members on it has been required and troublesome, and the remedy work has been hard.

DISCLOSURE OF THE INVENTION

This invention is made in consideration of the above-mentioned problems, and objects of this invention are to provide a flat expanded mesh, to provide a manufacturing method of expanded mesh enabling easy and precise manufacture of such an expanded mesh by means of a simultaneous opening by using a small die-set, and further to provide a flat lead acid storage battery plate having a good current collecting efficiency.

This invention provides a sheet-shaped expanded mesh made of a sheet-shaped material; characterized in that the expanded mesh comprises a reticulated portion and straight portions composed of non-expanded portions formed at least on one-side, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portions are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, the latitude skeletal element has a length which is substantially not elongated from a state of the sheet-shaped material, and the longitudinal skeletal element has a length which is elongated from a state of the sheet-shaped material within a range of breaking limit.

The expanded mesh having the above-mentioned structure is not bulged like a barrel because the latitude skeletal element has the length which is substantially not elongated from the state of the sheet-shaped material. In other words, it is flat. Since the longitudinal skeletal element is inclined acutely relative to the straight portion as compared with a conventional expanded mesh, it will become a grid with good current collecting efficiency when a lug of current collector plate is formed on an inclining direction side.

In the expanded mesh having the above structure, the node may be integrated with the latitude skeletal element. According to this structure, the latitude skeletal element will become thick so that a latitudinal rigidity will be improved.

This invention provides a manufacturing method of sheet-shaped expanded mesh made of a sheet-shaped material; characterized in that the expanded mesh comprises a reticulated portion and straight portions composed of non-expanded portions formed at least on one-side, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portions are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, a die-set is used which is equipped with at least one-row of die installed in an inclining position relative to a feed direction of the sheet-shaped material and plural shearing cutters protruding at its middle part and shearing with the die to shear the sheet-shaped material into broken-line-like shapes and opening it to form the reticulated portion, and a direction of shearing motion relative to the die of shearing cutter is set in a direction inclining to a thickness direction of the sheet-shaped material so as to include a pitch feed motion of the sheet-shaped material from its feed destination side to its feed origin side.

According to the above method, it becomes possible to elongate the longitudinal skeletal element only and not to elongate the latitude skeletal element. Thereby, the flat expanded mesh can be obtained in spite of the non-expanded portion included.

In the above manufacturing method, the following structures may be used.

(1) The shearing cutter has at its tip end a tooth protruding at its central part. The tooth has at least a first tooth for shearing and forming the latitude skeletal element and a third tooth for shearing and forming the longitudinal skeletal element. The first tooth is inclined by a first angle relative to a plane normal to the direction of shearing motion of the cutter, the sheet-shaped material facing on the cutter is inclined by a second angle to a side opposite to the first tooth relative to a plane normal to the direction of shearing motion of the cutter, and the first angle is set to a value approximately equal to or smaller than the second angle, the node is formed of a part, which is located between teeth of adjoining cutters and does not shear the sheet-shaped material, by pitch feeding the sheet-shaped material at a pitch smaller than or equal to a tooth width of the cutter.

In the above method, an inclining angle of a first tooth 71a relative to a horizontal plane X is β (first angle), an inclining angle of the whole cutter 7 relative to the horizontal plane X is α (second angle), and an inclining angle of a sheet-shaped material 10 relative to the horizontal plane X is α (second angle), as illustrated in FIG. 10. Therefore, in a part of the sheet-shaped material 10 immediately after being sheared by the cutter 7, a triangle having sides a and b becomes approximately an isosceles triangle because α is roughly equal to β. In other words, a length of the side a is roughly equal to a length of the side b. Accordingly, a latitude skeletal element 52 is formed by only shearing the sheet-shaped material 10 downward approximately as it is, and has a length substantially not elongated from a state of the sheet-shaped material 10. Consequently, the obtained expanded mesh does not become a mesh bulged like a barrel in latitudinal direction.

This invention provides a lead acid storage battery plate in which a paste-like active material is held in a grid having a sheet-shaped expanded mesh made of a sheet-shaped material; characterized in that the grid comprises a reticulated portion and straight portions composed of non-expanded portions formed on at least on one-side, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portions are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, the latitude skeletal element has a length which is substantially not elongated from a state of the sheet-shaped material, the longitudinal skeletal element has a length which is elongated from a state of the sheet-shaped material within a range of breaking limit, and a lug located on an elongated direction side of the longitudinal skeletal element is formed on the straight portion of one-side.

The lead acid storage battery plate having the above-mentioned structure is not bulged like a barrel because the latitude skeletal element has the length which is substantially not elongated from the state of the sheet-shaped material. In other words, it is flat. Since the lug is located on the elongated direction side of the longitudinal skeletal element, a good current collecting efficiency will become obtainable.

This invention provides an another lead acid storage battery plate in which a paste-like active material is held in a grid having a sheet-shaped expanded mesh made of a sheet-shaped material; characterized in that the grid comprises a reticulated portion and straight portions composed of non-expanded portions formed on opposing two-sides, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portions are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, the latitude skeletal element has a length which is substantially not elongated from a state of the sheet-shaped material, the longitudinal skeletal element has a length which is elongated from a state of the sheet-shaped material within a range of breaking limit, and a current collector having a lug is fitted to one-side, other than the straight portion, stretching over both ends of the straight portions located at both sides.

The lead acid storage battery plate having the above-mentioned structure is not bulged like a barrel because the latitude skeletal element has the length which is substantially not elongated from the state of the sheet-shaped material. In other words, it is flat. Since the latitude skeletal element stretches toward the current collector, a good current collecting efficiency will become obtainable. Further, the side on which the straight portion is installed can hold the active material even if another members are not installed.

This invention provides a further another lead acid storage battery plate in which a paste-like active material is held in a grid having a sheet-shaped expanded mesh made of a sheet-shaped material; characterized in that the grid comprises a reticulated portion and straight portions composed of non-expanded portions formed on opposing two-side, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portion are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, the latitude skeletal element has a length which is substantially not elongated from a state of the sheet-shaped material, the longitudinal skeletal element has a length which is elongated from a state of the sheet-shaped material within a range of breaking limit, and a lug is formed on one of the straight portions by prolonging an end of that straight portion.

Since it is not necessary to leave the wide straight portion for forming the lug in the lead acid storage battery plate having the above structure, an yield can be improved and it is possible to increase this yield to 100% according to circumstances.

BEST MODE FOR CARRYING OUT THE INVENTION (Embodiment 1)

Figure 1:
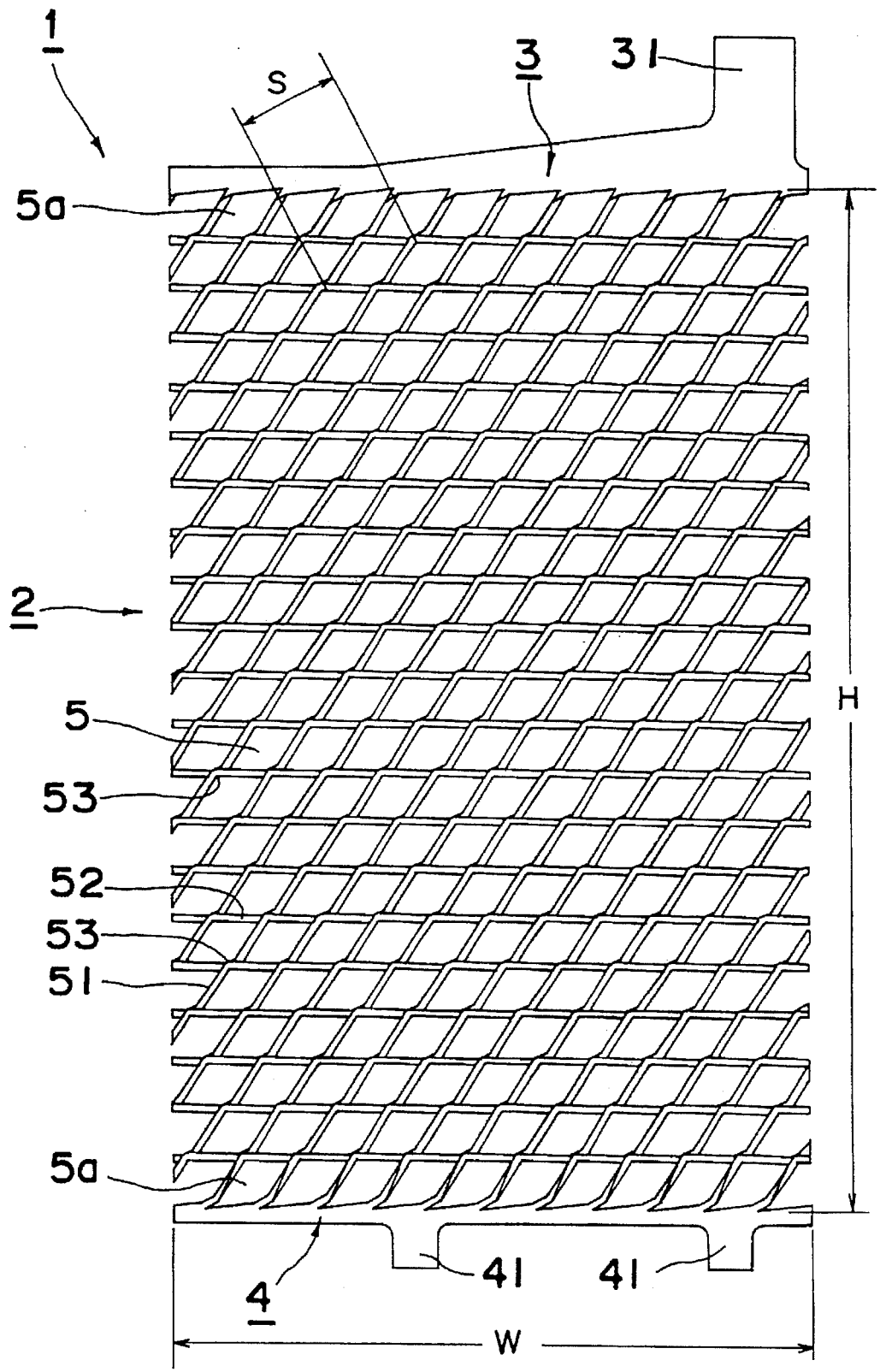
FIG. 1 is a front view showing a grid for use in a lead acid storage battery plate of embodiment 1.
Figure 6:
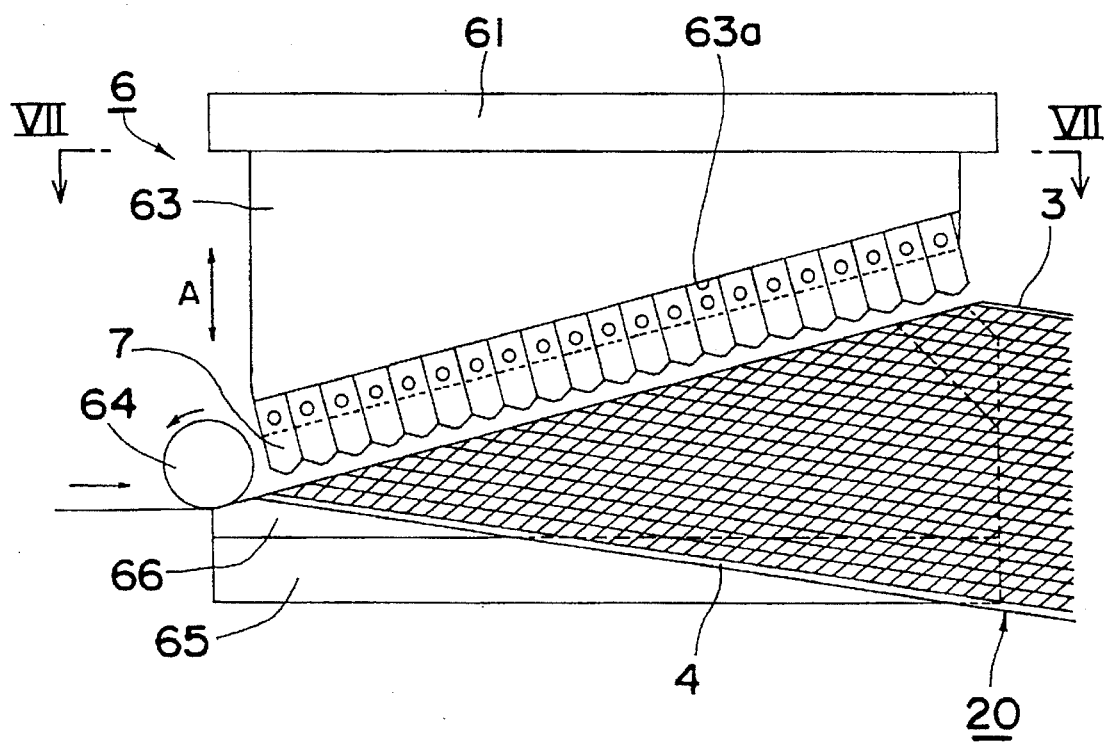
FIG. 6 is a side view showing a state of manufacturing work of expanded mesh in the embodiment 1.
Figure 7:
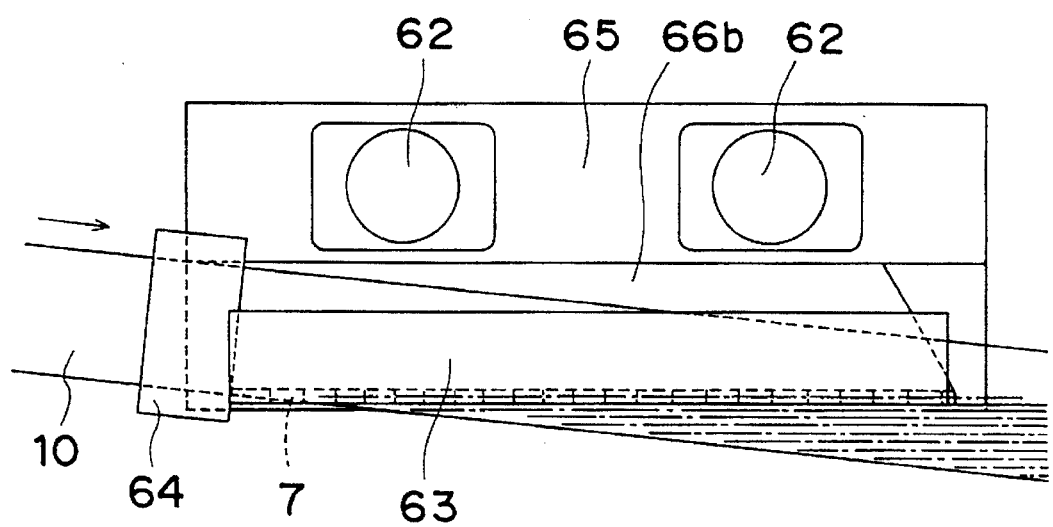
FIG. 7 is a sectional view taken on a line VII—VII of FIG. 6.

FIG. 1 is the front view showing the grid of the lead acid storage battery plate using the expanded mesh of this invention. A grid 1 is made up by cutting and working an expanded mesh 20 prepared as shown by FIG. 6 and FIG. 7 into prescribed shape and size. The grid 1 comprises a lead alloy and is composed of a reticulated portion 2 and straight portions 3 & 4 comprising non-expanded portions formed on two-sides of the reticulated portion 2 opposing each other. The straight portions 3 & 4 are in parallel each other. The one straight portion 3 is called as an upper rib and the other straight portion 4 is called as a lower rib. The upper rib 3 functions as a current collector plate.

The reticulated portion 2 includes a large number of meshes 5 surrounded by longitudinal skeletal elements 51 inclining relative to the straight portions 3 & 4, latitude skeletal elements 52 approximately parallel with the straight portions 3 & 4, and nodes 53 of the both skeletal elements 51 & 52. A mesh 5a adjacent to the straight portions 3 & 4 is surrounded by the longitudinal skeletal elements 51, the latitude skeletal element 52, the nodes 53 and the straight portion 3 or 4. The mesh 5 is surrounded by a pair of approximately parallel longitudinal skeletal elements 51 & 51 and a pair of approximately parallel latitude skeletal elements 52 & 52 and a pair of nodes 53 & 53 opposing each other. The meshes 5 adjacent in latitudinal direction have the longitudinal skeletal element 51 in common, and the meshes 5 adjacent in longitudinal direction have the latitude skeletal element 52 in common.

In other words, each node 53 is divided at its both sides into the longitudinal skeletal element 51 inclining relative to the straight portions 3 & 4 and the latitude skeletal element 52 approximately parallel to the straight portions 3 & 4, and the other ends of respective skeletal elements 51 & 52 connect to the nodes 53 located at respective directions.

The grid 1 is of a sheet-shaped type made of a sheet-shaped material. The latitude skeletal element 52 has a length which is not elongated from a state of the sheet-shaped material. The longitudinal skeletal element 51 has a length which is elongated from the state of the sheet-shaped material within a range of breaking limit.

A lug 31 is so formed on the upper rib 3 unevenly as to be deviated to an elongated direction side of the longitudinal skeletal element 51. While, leg pieces 41 are formed on the lower rib 4.

Practical sizes of the grid 1 of this embodiment are 230 mm in height H and 145 mm in width W of the reticulated portion 2, and 24 mm in pitch S of the node 53. The meshes 5 & 5a are formed in 21 rows in a direction of height. The lead acid storage battery plate of this embodiment is designed for a stationary sealed-type lead acid storage battery, and the lead-calcium type alloy is used for the sheet-shaped material.

According to the grid 1 having the above structure, the grid 1 maintains a flatness because the latitude skeletal element 52 has the length which is not elongated from the state of the sheet-shaped material. Namely, the grid 1 is not bulged at its central part like a barrel.

When the grid 1 having the above structure is used for the lead acid storage battery plate, the current collecting efficiency is made better because the longitudinal skeletal elements 51 are directed to a position where the lug 31 is located.

A method for manufacturing the expanded mesh 20 for use in the grid 1 having the above structure will be explained hereunder.

Figure 2:
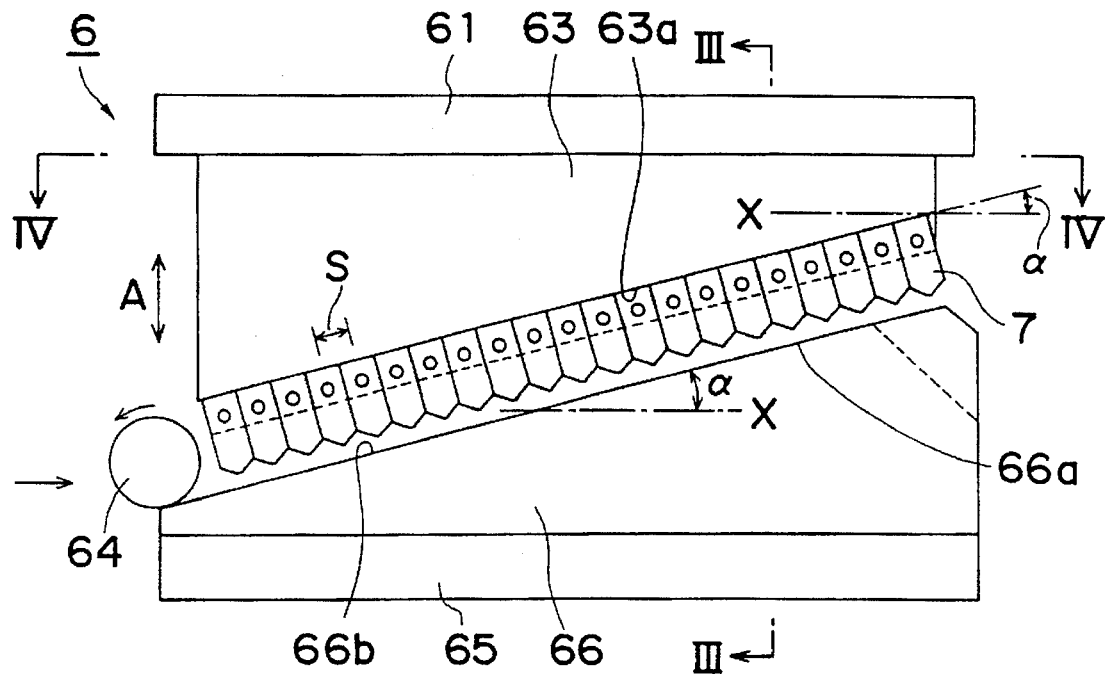
FIG. 2 is a side view showing a die-set for use in a manufacturing method of an expanded mesh in the embodiment 1.
Figure 3:
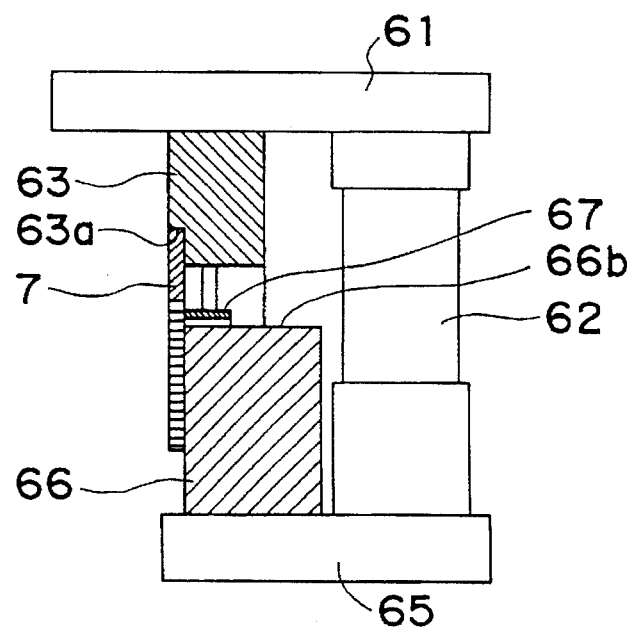
FIG. 3 is a sectional view taken on a line III—III of FIG. 2.
Figure 4:
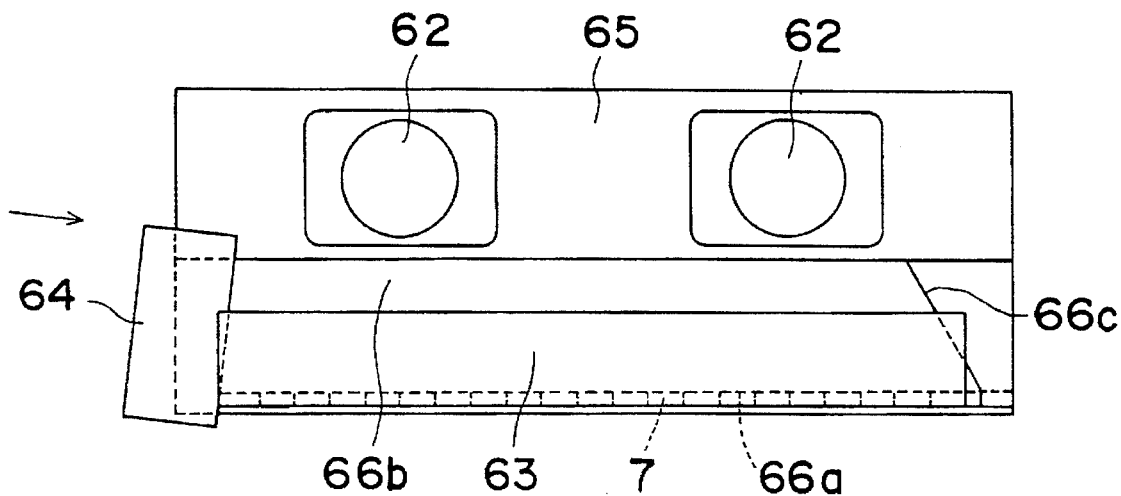
FIG. 4 is a sectional view taken on a line IV—IV of FIG. 2.

FIG. 2 is the side view showing the die-set 6 used in this manufacturing method, FIG. 3 is the sectional view taken on the line III—III of FIG. 2 and FIG. 4 is the sectional view taken on the line IV—IV of FIG. 2. In the die-set 6, an upper die base 61 is designed to be moved vertically by a drive mechanism (not shown) along a guide post 62 as shown by an arrow A. A cutter mounting bed 63 is fixed to the upper die base 61, and shearing cutters 7 of same shapes and same sizes are arranged in one row and mounted on a lower face 63a of the mounting bed 63. The lower face 63a is tilted by an angle α relative to a horizontal plane X i.e. a plane normal to the moving direction of the upper die base 61. Namely, a line which connects spots corresponding to parts of remaining sheet-shaped material between adjacent cutters 7 when shearing the sheet-shaped material, is also tilted by the angle α relative to the horizontal plane X. 64 is a sheet feed roller located at a feed origin side of the sheet-shaped material. A die 66 having a shearing edge 66a opposing the cutter 7 and a feed face 66b feeding the sheet-shaped material are secured to a lower die base 65. The shearing edge 66a faces on and in parallel with the lower face 63a. In other words, the shearing edge 66a is also tilted by the angle α relative to the horizontal plane X. The angle α is so tilted that the feed origin side is positioned lower and the feed destination side is positioned higher. The cutters 7 are installed at 21 spots, and an installation pitch S of the cutters 7 is set equal to a pitch S of the expanded mesh 1. The die 66 is cut at its other side from the shearing portion on the cutter 7 at feed destination side end, so that a part forming the upper rib 3 can be bent and relieved.

Figure 5:
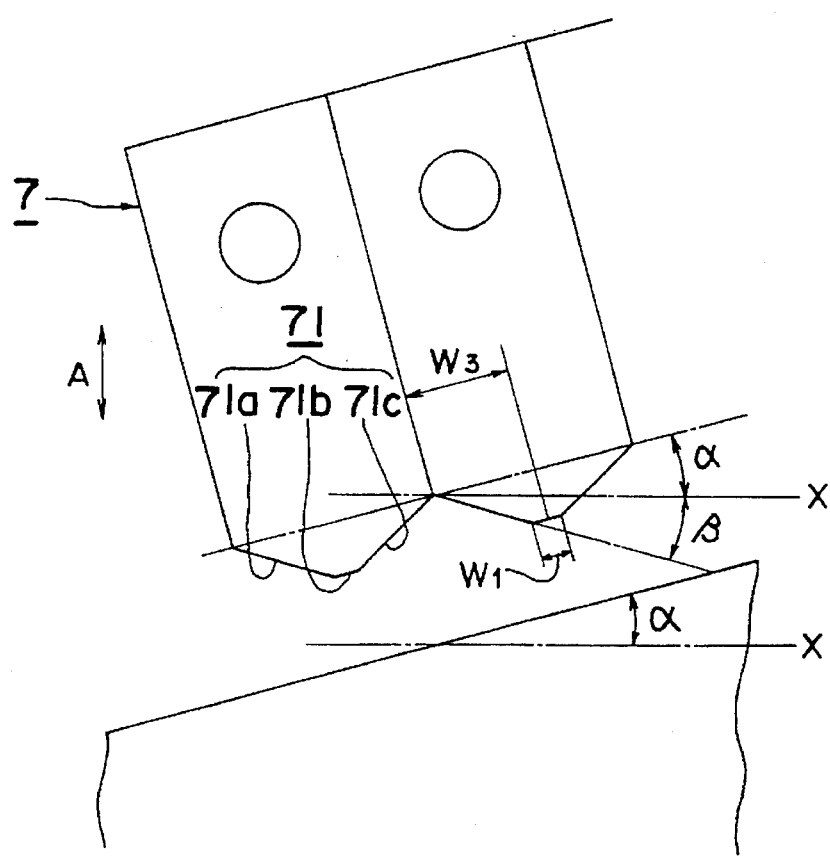
FIG. 5 is a partially enlarged side view showing a shearing cutter and die of a die-set of FIG. 2.

As shown in FIG. 5, a tooth 71 of the shearing cutter 7 is formed into a concave shape having a flat second tooth 71b at its top by a first tooth 71a, the second tooth 71b and a third tooth 71c. The first tooth 71a is tilted by an angle β relative to the horizontal plane X. The tooth 71 has a symmetrical shape having the second tooth 71b at its center. In this embodiment, the α and β are 15 degrees and a width W1 of the second tooth 71b is 3 mm.

The expanded mesh 20 is manufactured by using the die-set 6 having the above structure in the following way. FIG. 6 is the side view showing the state of midway of manufacture. FIG. 7 is the sectional view taken on the line VII—VII of FIG. 6. The sheet-shaped material 10 is passed through a roller 64 under a state of being inclined by an angle γ (FIG. 7) relative to a row of the cutters 7 and sent to the shearing edge 66a with a prescribed pitch P. Under an intermittent stop condition in feeding, the upper die base 61 is moved vertically to cut broken-line-like slits on the sheet-shaped material 10 and open the slits downward by the teeth 71 of the cutter 7. This work is carried out continuously. Thereby, the expanded mesh 20 having the meshes 5 arranged at zigzag pattern is formed. In this operation, the material is fed to the die-set 6 with one-side edge 10a of the sheet-shaped material 10 located at a position of fully lower side in FIG. 7 from a feed origin end cutter 7 and the other-side edge 10b located at a position of fully upper side in FIG. 7 from a feed destination end cutter 7, so that the expanded mesh 20 having the straight portions 3 & 4 comprising the non-expanded portions can be obtained at both sides thereof. In this instance, the straight portion 4 is formed in a state of standing upright from a plane of the reticulated portion 2. However, the straight portion 4 can be taken out in flash with the plane of the reticulated portion 2 by previously bending it or by installing a projection for bending at an outside of the feed origin end cutter 7. In case where the one-edge 10a of the sheet-shaped material 10 is scarcely protruded out of the feed origin side end cutter 7, it is not necessary to bend the straight portion 4 for flattening. In FIG. 3, 67 is a sheet holding mechanism.

Figure 8:
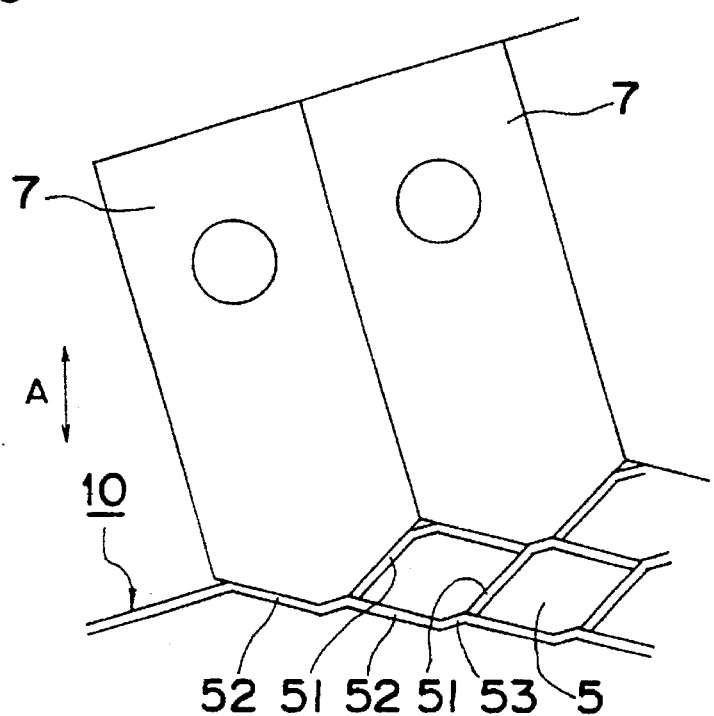
FIG. 8 is a partially enlarged side view showing a state where the shearing cutter is moved downward in the manufacturing work of expanded mesh in the embodiment 1.
Figure 9:
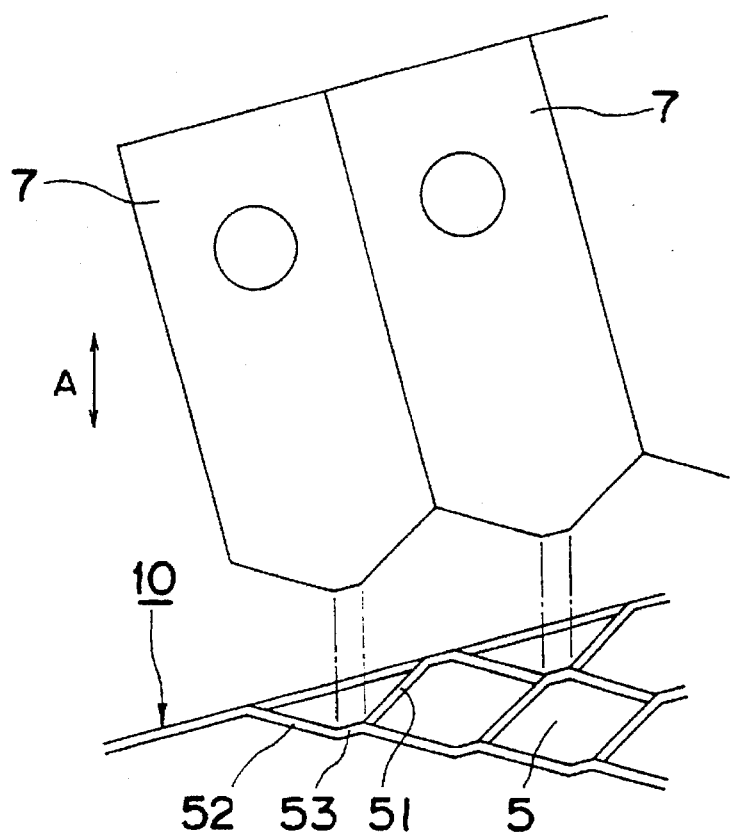
FIG. 9 is a partially enlarged side view showing a state where the shearing cutter is moved upward from the state of FIG. 8.
Figure 10:
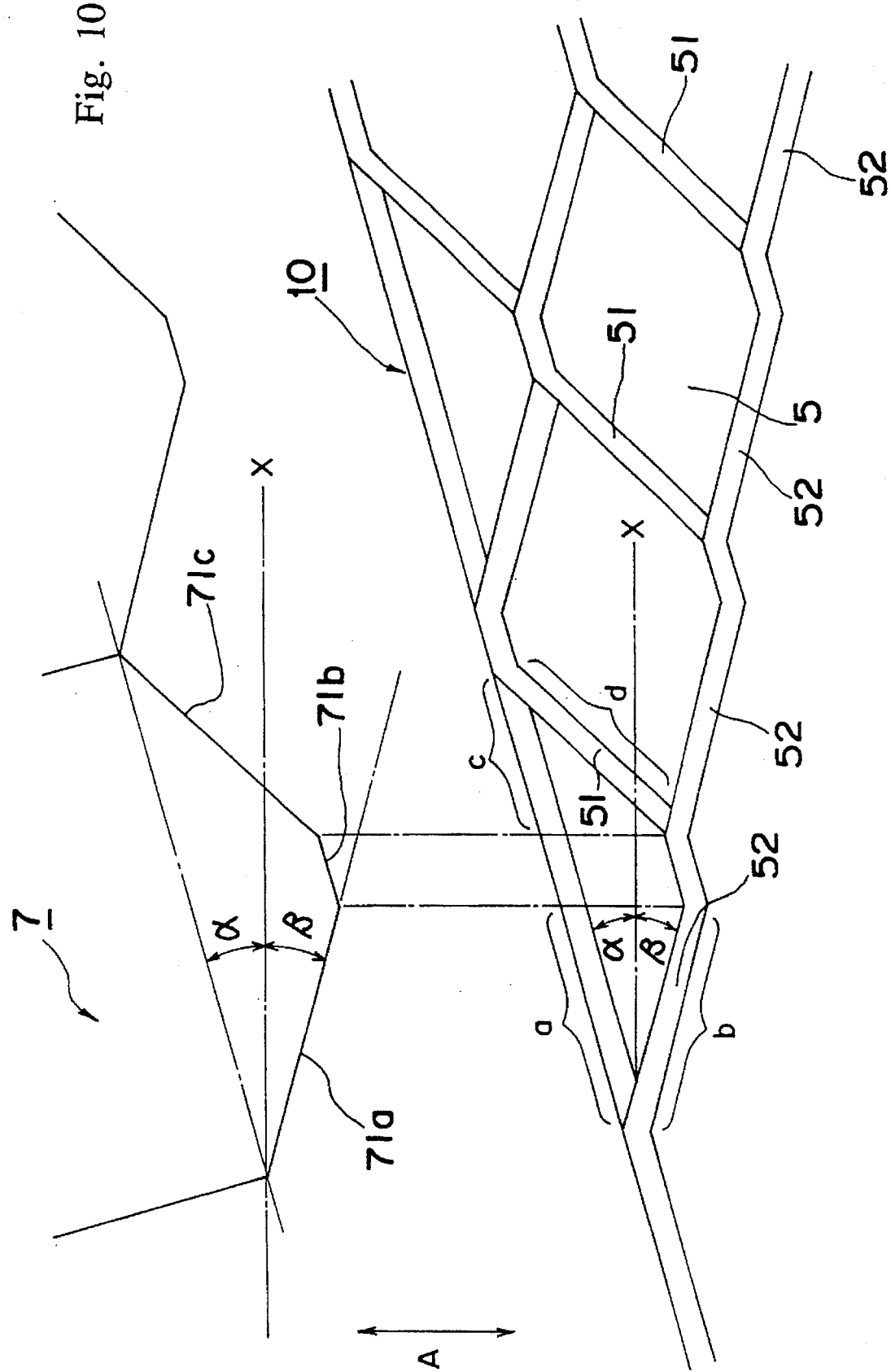
FIG. 10 is a partially enlarged side view for explaining a relation between a tooth of shearing cutter and a shape of mesh.

FIG. 8 is the partially enlarged side view showing the state where the sheet is sheared by the cutter 7 into the broken-line-like shapes. FIG. 9 is the partially enlarged side view showing the state where the cutter 7 is raised after the shearing. FIG. 10 is the partially enlarged side view for explaining the relation between the tooth of the cutter 7 and the shape of the mesh 5. When the sheet-shaped material 10 is subjected to the shearing work by the die-set 6 having the above structure, the latitude skeletal element 52, is sheared and formed by the first tooth 71a, becomes to have a length which is not elongated from the state of the sheet-shaped material 10 and the longitudinal skeletal element 51, is sheared and formed by the third tooth 71c, becomes to have a length which is elongated from the state of the sheet-shaped material 10 with a prescribed elongation ratio E, and the node 53 is formed of a part which is located between teeth of adjoining cutters 7 and does not shear the sheet-shaped material 10. The detailed explanation is as follows. As illustrated in FIG. 10; the inclining angle of the first tooth 71a relative to the horizontal plane X or a plane normal to the moving direction of the cutter 7 is β, the inclining angle of the entire cuter 7 relative to the horizontal plane X is α, and the inclining angle of the die 66 or the sheet-shaped material 10 relative to the horizontal plane X is α. Therefore, in a part of the sheet-shaped material 10 immediately after being sheared by the cutter 7, a triangle having sides a and b becomes an isosceles triangle because α is equal to β. Namely, a length of the side a is equal to a length of the side b. Consequently, the sheet-shaped material 10 is sheared downward with its length as it is so that the latitude skeletal element 52 becomes to have a length which is not elongated from the state of the sheet-shaped material 10. On the other hand, the side d or the longitudinal skeletal element 51 has a length which is elongated from the side c at a prescribed elongation ratio E as illustrated in FIG. 10. Incidentally, the sheet-shaped material 10 has a breaking limit at which it is broken when elongated beyond the limit. The elongation ratio E of the longitudinal skeletal element 51 must naturally be within a range of the breaking limit. The elongation ratio E can be calculated from the following equation.

$$\text{Elongation ratio } E = d/c = \cos \alpha / \cos(\alpha + \delta)$$

where $\delta = \alpha + \beta$ because the cutter 7 has a symmetrical shape with its center at the second tooth 71b. Therefore, the above equation becomes as follows. Elongation ratio $E = \cos \alpha / \cos(2\alpha + \beta)$ Since $\alpha = \beta = 15$ degrees in this embodiment, the elongation percentage E is equal to 1.366. A breaking limit of the lead-calcium alloy forming the sheet-shaped material 10 is about 1.4. Accordingly, the longitudinal skeletal element 51 can be formed without being broken in this embodiment.

A cut width W2 (not shown) of the sheet-shaped material 10 i.e. a width of the longitudinal skeletal element 51 and the latitude skeletal element 52 before being subjected to elongation, can be expressed by the following equation.

$$W2 = P \cdot \sin \gamma \cdot \cos \alpha$$

While, in order to form the meshes 5 of the reticulated portion 2 into the zigzag shape as illustrated by the figure, it is necessary to set a value of the pitch P close to a value of a width W3 (FIG. 5) up to a central part of the second tooth 71b of the cutter 7. The W3 is equal to 12 mm and the angle γ is equal to 6 degrees in this embodiment, so that sin γ·cos α is about 0.1. Therefore, the cut width W2 becomes 1.1 mm when the pitch P is 11 mm, and the cut width W2 becomes 1.4 mm when the pitch P is 14 mm.

As mentioned above, according to the above manufacturing method using the die-set 6 having the above structure, the following effects can be obtained.

(1) The expanded mesh 20 having at least any one of the straight portions 3 & 4 can be formed continuously from the sheet-shaped material 10.

(2) The latitude skeletal elements 52 composing the meshes 5 can be formed as one having the length which is not elongated from the state of the sheet-shaped material 10. Consequently, the expanded mesh 20 in the state not bulged like a drum i.e. in the flat state can be obtained.

(3) Since the work making cut-slits is done simultaneously with the opening work, a precision of the reticulated portion can be improved. Since a special opening process is not required, the work can be simplified. When a device for shifting phases of the straight portions 3 & 4 at both sides is installed additionally in the next process, a degree of opening of mesh can be changed.

(4) By only changing the feed angle or the feed pitch of the sheet-shaped material 10 to the die-set 6, the reticulated portions 2 with different cut widths can be formed easily by the same die-set 6.

(5) By only changing the number of cutter 7 used, a height (corresponding to H of FIG. 1) of the reticulated portion 2 can be changed easily.

(6) Since the mounting face 63b of the cutter 7 of the mounting bed 63 is flat, the cutters 7 arranged in one row can be made up integrally from a flat plate and the pitch of the cutters 7 can thereby be set freely without making bones about relation with fitting holes. Therefore, the cutters 7 can be replaced easily and it becomes easy to cope with a change in shape of the mesh.

(7) Cutters 7 having same shapes and same sizes may be used even at the feed origin side end and feed destination side end. Consequently, the meshes 5a in the vicinity of the straight portions 3 & 4 comprising the non-expanded portions can be formed in about same sizes as the other meshes S. Namely, it is not necessary to minimize the sizes of meshes in the vicinity of the non-expanded portions as required in conventional cases. Accordingly, the sheet-shaped material 10 can be utilized effectively and the expanded mesh able to hold much more active materials can be obtained.

(8) Since the straight portions 3 & 4 are arranged in parallel with a direction of manufacture of the expanded mesh 20, pasting process of paste-like active material can be carried out continuously onto the expanded mesh having the straight portions comprising the non-expanded portions.

(9) In the die-set 6 having the above structure, the straight portion 3 obtained in FIG. 7 can be relieved while being bent and the reticulated portion 2 can be prevented from being deformed because the die 66 does not exist at a further feed destination side from the cutter 7 located at the feed destination side end. When the die 66 at a further feed destination side from the cutter 7 located at the feed destination side end is so formed into an circular shape as to be relieved, it becomes possible to eliminate an indentation made on a backside of the straight portion 3.

(10) In the die-set 6 having the above structure, the die 66 is cut at a further feed destination side from the cutter 7 located at the feed destination side end. When this cutting line is made deeper as it gets to the backside as shown by 66c of FIG. 4, the obtained reticulated portion 2 can be drawn out on the gentle slope.

(11) When the pitch P is made small as compared with the width W3 (FIG. 5) of the first cutter 7 or a push-in depth of the cutter 7 into the sheet-shaped material 10 is made large as compared with the case of FIG. 8, corrugations in a direction of thickness of sheet-shaped material 10 are scarcely formed on the straight portions comprising the non-expanded portions. Slight corrugations may be flattened by roller work etc. in an after-process.

(12) Even if lengths of the row of cutter 7 and the shearing edge 66a of the die 66 are short as compared with lengths of the conventional parallel cutter system, an expanded mesh satisfied in its height (H of FIG. 1) can be obtained. Namely, a desired expanded mesh can be obtained by a small die-set. In concrete, as an example of aforesaid lead-calcium alloy, a length of the row of cutter 7 of the die-set 6 for obtaining an expanded mesh with a height H of 230 mm, corresponds to 24 (mm) by 21 (teeth) which is about 500 mm. On the contrary, when an opening height of one cutter is assumed as 7.8 mm, a required length of cutter row becomes 24 mm×1.5×(230 mm/7.8 mm)=1,080 mm in the parallel cutter system. A press machine driving such a long cutter row is extremely particular one which is slow in its drive speed and can not manufacture the expanded mesh with low cost and at high speed. Only an expanded mesh with a height of about 150 mm can be obtained in the conventional parallel cutter system, on the condition that the length of cutter row should be kept within 700 mm which is a limit length in order not to use a particular press machine. In other words, the above-mentioned manufacturing method of this invention can be applied effectively for obtaining an expanded mesh of lead acid storage battery plate having a height of about 150 mm or larger.

(13) Since the lug 31 which is deviated to the elongation direction side of the longitudinal skeletal element 51, is made on the upper rib 3, a current collecting efficiency can be improved when the expanded mesh is applied to the lead acid storage battery plate. Since a direction of the fixed lug 31 coincides with the elongation direction of the positive plate, the elongation of positive plate can be prevented when the expanded mesh is applied to the positive plate of lead acid storage battery.

A lead acid storage battery plate can be prepared from the expanded mesh obtained through the above manufacturing method, by being subjected to the following processes [1] to [4].

[1] Flattening process, in which concave parts of the reticulated portions 2 are crushed down and bendings of the straight portions 3 & 4 relative to the reticulated portion 2 are removed, so that the entire expanded mesh is flattened.

[2] Pasting process, in which a pasting paper is made contact with a backside of the mesh and a paste-like active material is applied thereon, and the pasting paper is made contact with a front side of the mesh and pressed thereon.

[3] Trimming process, in which a lug 31 and a leg piece 41 are punched and formed from the straight portions 3 & 4 at both sides of the reticulated portion 2, so that the mesh is cut to a plate size.

[4] Drying process, in which the plate is dried.

(Embodiment 2)

Figure 11:
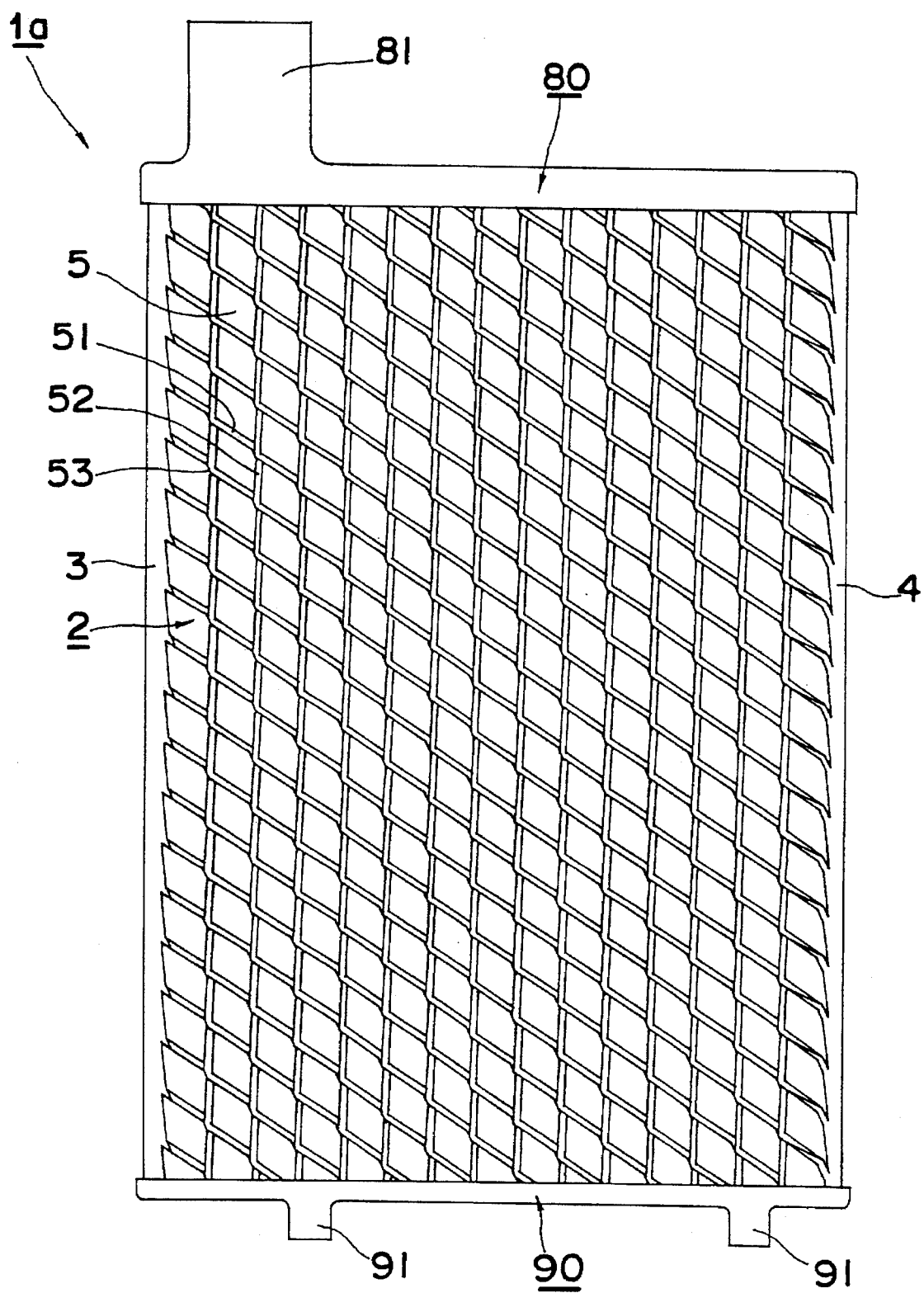
FIG. 11 is a front view showing a grid for use in a lead acid storage battery plate of embodiment 2.

FIG. 11 is the front view showing the grid for use in the lead acid storage battery plate of this invention. This grid 1a is formed in such a way that an expanded mesh 20 prepared as shown in FIG. 6 and FIG. 7 by using a sheet-shaped material comprising a copper alloy is cut to prescribed size and shape, a current collector plate 80 made of lead alloy having a lug 81 is attached thereto, a surface of the reticulated portion 2 is thereafter subjected to lead coating treatment, and a support plate 90 made of resin having a leg piece 91 is attached thereto. In other words, the grid 1a has a structure in which the expanded mesh of embodiment 1 is turned by 90 degrees, and the reticulated portion 2 has a large number of meshes 5 surrounded by longitudinal skeletal elements 51 inclined relative to the straight portions 3 & 4, latitude skeletal elements 52 approximately parallel to the straight portions 3 & 4, and nodes 53 of the both skeletal elements 51 & 52. The current collector plate 80 is attached thereto by casting and the support plate 90 is attached thereto by bonding. When the paste-like active material is applied to the grid 1a, the lead acid storage battery plate is prepared.

In the grid 1a having the above structure, the mesh 5 is prevented from opening to both right and left sides by the straight portions 3 & 4. Therefore, the paste-like active material applied to this part can be prevented from falling off so that a holding rate of the paste-like active material can be improved as compared with the grid 1 of embodiment 1.

(Embodiment 3)

Figure 12:
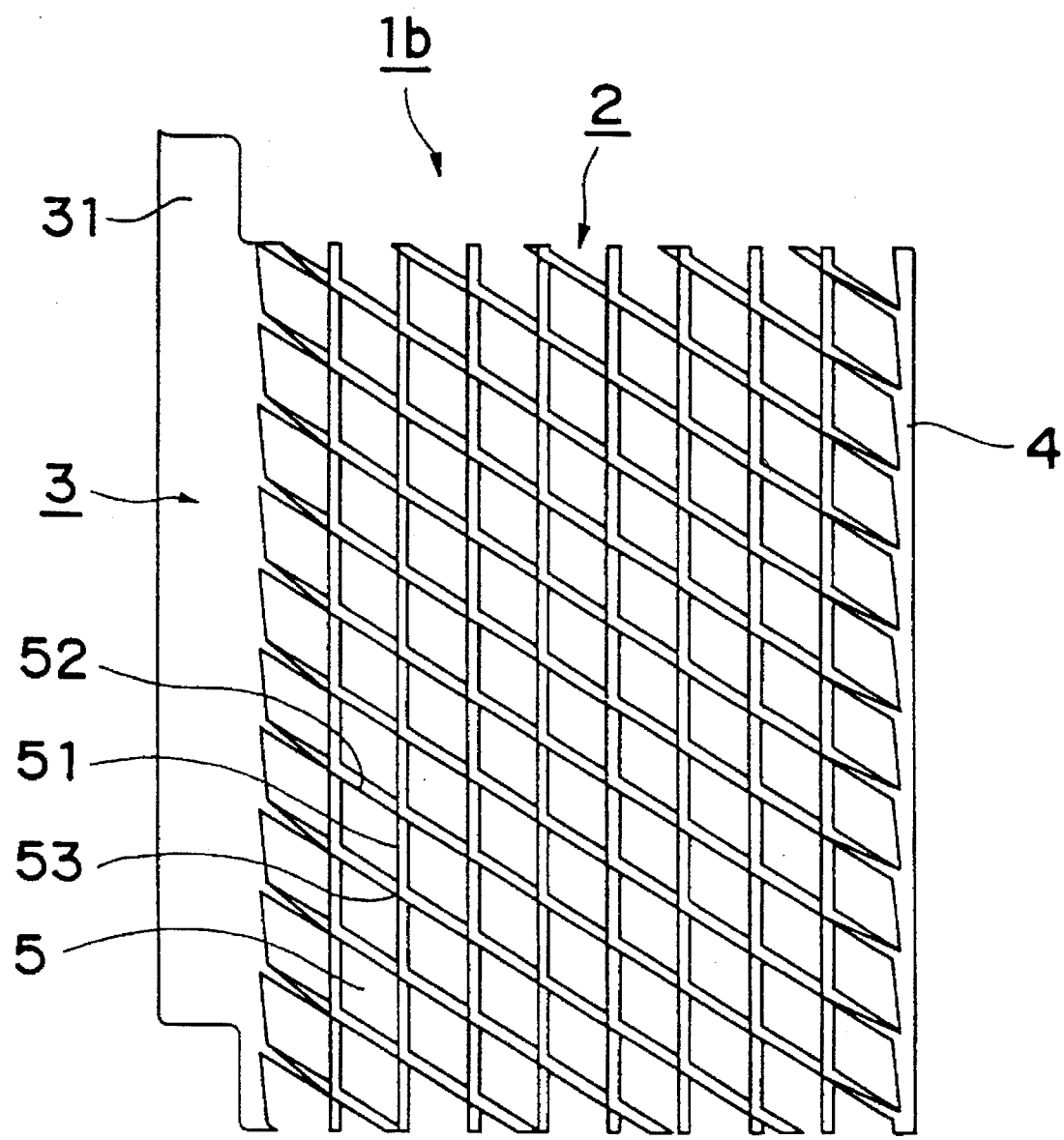
FIG. 12 is a front view showing a grid for use in a lead acid storage battery plate of embodiment 3.

FIG. 12 is the front view showing the grid for use in the lead acid storage battery plate of this invention. This grid 1b is manufactured in the same manufacturing method as that of the lead acid storage battery plate shown in the embodiment 1. However, its trimming process is different from a trimming process of embodiment 1 in a point that the straight portion 3 is punched into a shape as shown in the figure. The grid 1b has a structure in which the expanded mesh of embodiment 1 is turned by 90 degrees in the same way as the grid 1a of embodiment 2, and the reticulated portion 2 has a large number of meshes 5 surrounded by longitudinal skeletal elements 51 inclined relative to the straight portions 3 & 4, latitude skeletal elements 52 approximately parallel to the straight portions 3 & 4, and nodes 53 of the both skeletal elements 51 & 52.

A lug 31 is made on one end of the straight portion 3 into a shape of its extension and the other end of it is notched. The notched portion of the other end is a portion becoming a lug of a succeeding grid. In a manufacture of the grid 1b of this embodiment, a cutter 7 having no second tooth 71b or a tip pointed cutter 7 is used.

In the grid 1b having the above structure, it is not necessary to leave the straight portion having a large width for forming the lug, so that a yield can be improved and a yield of 100% may be accomplished if circumstances require.

(Embodiment 4)

Figure 13:
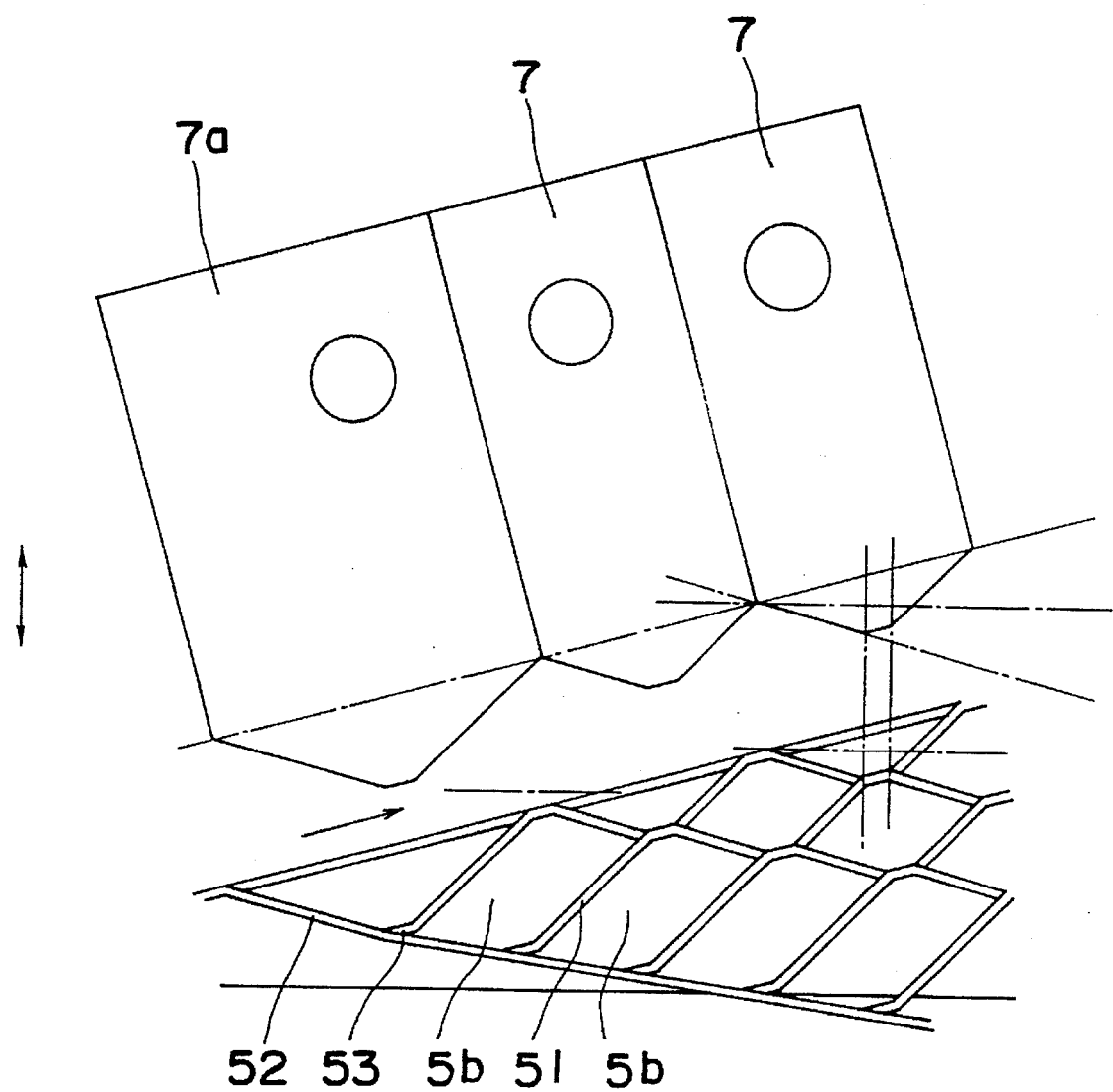
FIG. 13 is a partially enlarged side view showing a manufacturing process of expanded mesh in embodiment 4.

FIG. 13 is the partially enlarged side view showing one manufacturing process partially using a different shaped cutter 7a in the die-set 6. The cutter 7a has a size larger than those of other cutters 7. In this case, an expanded mesh partially including meshes 5b having large sizes formed by the cutter 7a can be prepared.

(Embodiment 5)

Figure 14:
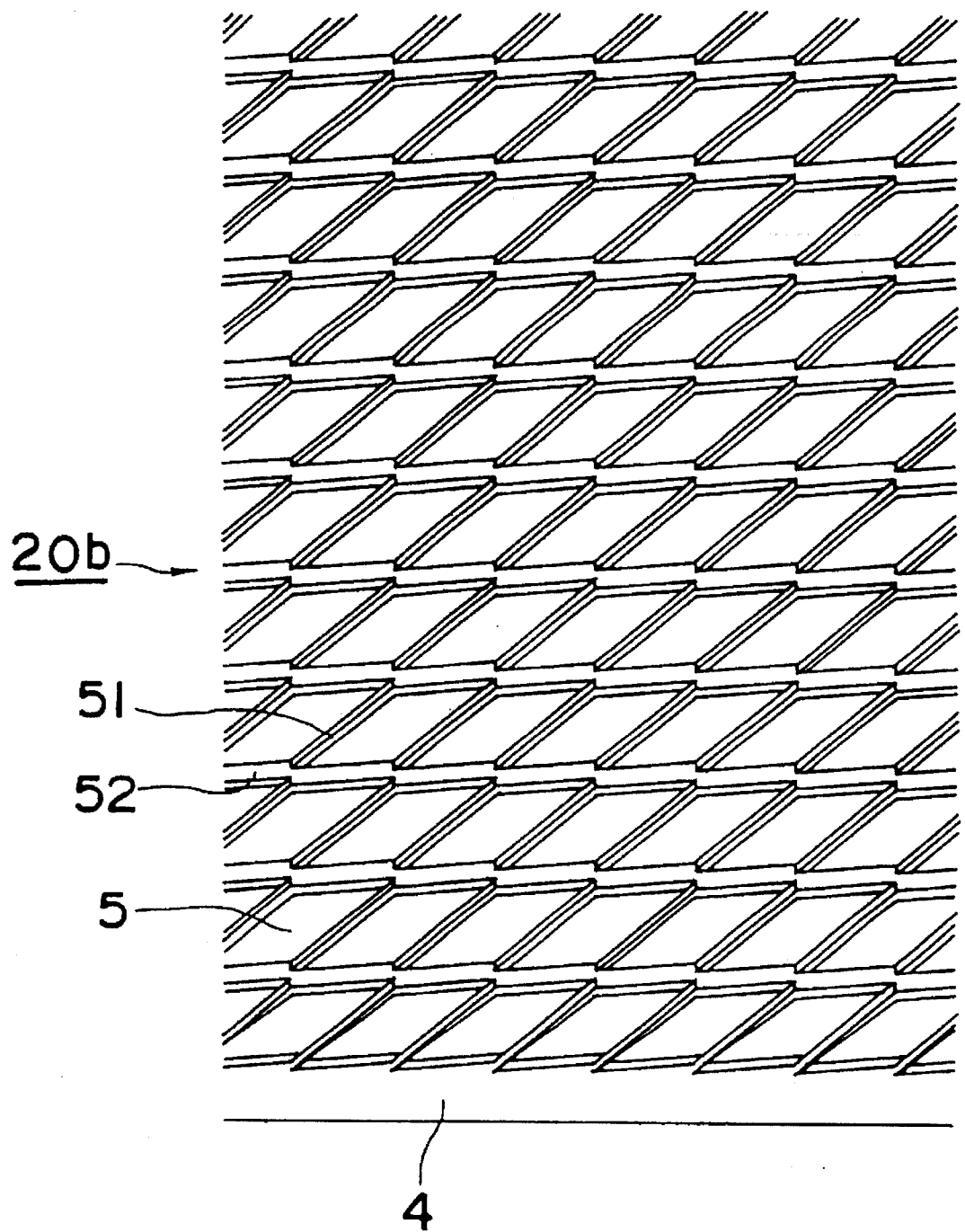
FIG. 14 is a partial front view showing an expanded mesh of embodiment 5.

FIG. 14 is the partial front view showing the expanded mesh 20, in which the node is overlapping with the latitude skeletal element 52, and the latitude skeletal element 52 has a thickness twice as large as that of the longitudinal skeletal element 51 before being cut open. The latitude skeletal element 52 has a length which is not elongated from a length of the sheet-shaped material.

This expanded mesh 20b is prepared in such a way that a cut length of the cutter 7 in the die-set 6 is made similar to a non-cut length between it and an adjacent cutter 7, and the pitch P is made about two thirds of the width W3 (FIG. 5) of the cutter 7. Namely, the expanded mesh 20b having a shape wherein the node is apparently overlapping with the latitude skeletal element 52, can be formed.

(Other Embodiments)

Following structures may be used.

(1) A die having a structure in which shearing portions facing each other are formed at both sides and distances between the both shearing portions are gradually increasing, from upside to downside, that is, from the feed destination side to the feed origin side, may be used in combination with a cutter row arranged in two lines in correspondence with the shearing portions. According to this structure, an expanded mesh having a non-expanded straight portion at its intermediate part can be obtained.

(2) A structure may be used in which an intermediate part of the die is eliminated to be formed into a stepped shape i.e. an intermediate die and cutters are eliminated so as to shorten them. Even by this structure, an expanded mesh having the non-expanded straight portion at its intermediate part can be obtained.

(3) By using a cutter having unsymmetrical left and right teeth, lengths and angles of the longitudinal skeletal element and latitude skeletal element of the obtained expanded mesh can be changed.

(4) A cutter having a tooth comprising the first tooth and the third tooth only, i.e. a cutter having a tip pointed tooth, may be used. When the node is located at a position in line with the longitudinal skeletal element or latitude skeletal element in this case, the tip pointed part of the tooth does not touch with the node so that the expanded mesh can be manufactured without giving an excessive force to it.

(5) A cutter may be used, in which at least one of the first tooth and the third tooth has a curved face.

(6) A cutter having a small tooth height may be used for a feed origin side end cutter or a feed destination side end cutter, among cutters arranged in one row. According to this structure, an elongation percentage of a longitudinal skeletal element located at a boundary with the straight portion comprising the non-expanded portion can be minimized so as to control a breakage of the longitudinal skeletal element.

(7) In case for example where a longitudinal skeletal element formed in the vicinity of the feed destination side end is required to be made thick, it is enough to further tilt a flat-viewed angle of shearing edges of the cutter and die at that part relative to the sheet-shaped material.

(8) In case for example where an elongation percentage of a longitudinal skeletal element formed in the vicinity of the feed destination side end is required to be minimized, it is enough to decrease an angle of shearing edges of the cutter and die at that part relative to the horizontal plane.

(9) In the die-set 6, the upper die 61 moves vertically and the cutter 7 and the shearing edge 66a incline relative to the horizontal plane by the angle $\alpha$. However, the angular relation between the two is relative. Therefore, a die-set may be manufactured and used, in which the cutter and the shearing edge are in horizontal positions and the upper die moves in a position tilted by the angle $\alpha$.

(10) Each cutter may be so installed that it can swing around a swing center located at the feed origin side and the relative angular relation mentioned in the above paragraph (9) is maintained.

(11) The straight portion comprising the non-expanded portion formed on the feed origin side is apt to be bent relative to a plane comprising the reticulated portion. To cope with this problem, a pre-bending opposite to the above bent side is worked on a part of the sheet-shaped material which will become the above straight portion. The bending of the straight portion can thereby be controlled so as to ease the flattening work after that.

Industrial Applicability

The expanded mesh of this invention is flat because its latitude skeletal element has a length which is not elongated from a state of sheet-shaped material, and straight portions can be formed on opposing two sides. Therefore, the expanded mesh can be utilized effectively in various fields, and particularly can be utilized effectively for a grid of lead acid storage battery plate.

What is claimed is:

1. A manufacturing method of sheet-shaped expanded mesh made of a sheet-shaped material; characterized in that
    the expanded mesh comprises a reticulated portion and straight portions composed of non-expanded portions formed at least on one-side, the reticulated portion has a large number of meshes surrounded by longitudinal skeletal elements inclining relative to the straight portions, latitude skeletal elements approximately parallel to the straight portions, and nodes of the both skeletal elements, meshes not adjacent to the straight portions are surrounded by a pair of approximately parallel latitude skeletal elements, a pair of approximately parallel longitudinal skeletal elements, and a pair of nodes opposing each other, meshes adjacent in latitudinal direction have the longitudinal skeletal elements in common, a die-set is used which is equipped with at least one-row of die installed in an inclining position relative to a feed direction of the sheet-shaped material and plural shearing cutters protruding at its middle part and shearing with the die to shear the sheet-shaped material into broken-line-like shapes and opening it to form the reticulated portion, and a direction of shearing motion relative to the die of shearing cutter is set in a direction inclining to a thickness direction of the sheet-shaped material so as to include a pitch feed motion of the sheet-shaped material from its feed destination side to its feed origin side.

2. A manufacturing method of sheet-shaped expanded mesh as set forth in claim 1, in which the shearing cutter has at its tip end a tooth protruding at its central part;

the tooth has at least a first tooth for shearing and forming the latitude skeletal element and a third tooth for shearing and forming the longitudinal skeletal element; the first tooth is inclined by a first angle relative to a plane normal to the direction of shearing motion of the cutter, the sheet-shaped material facing on the cutter is inclined by a second angle to a side opposite to the first tooth relative to a plane normal to the direction of shearing motion of the cutter, and the first angle is set to a value approximately equal to or smaller than the second angle, the node is formed of a part, which is located between teeth of adjoining cutters and does not shear the sheet-shaped material, by pitch feeding the sheet-shaped material at a pitch smaller than or equal to a tooth width of the cutter.

* * * * *